Dec. 24, 1968
C. B. DE VLIEG ET AL
3,417,662
POSITIONING MECHANISM FOR MACHINE TOOLS
Filed Oct. 23, 1965
9 Sheets-Sheet 5
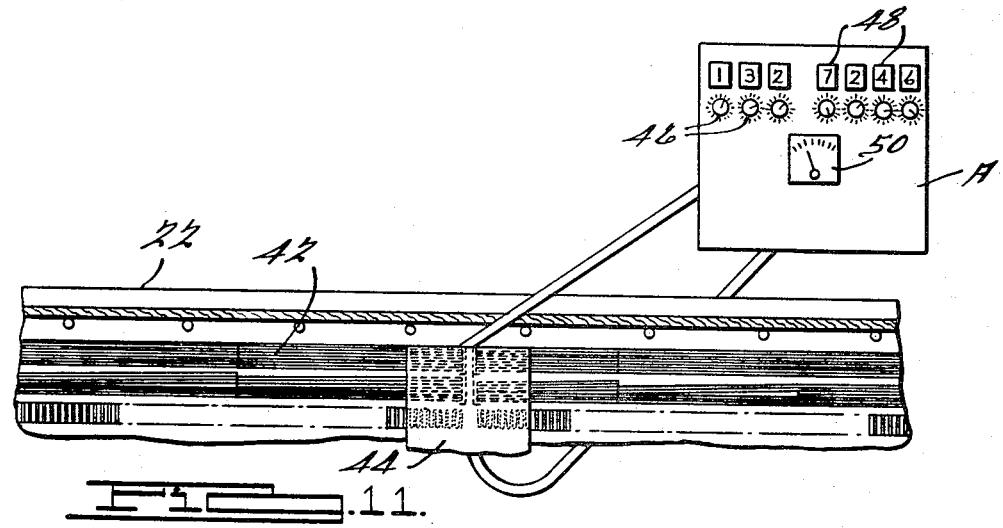
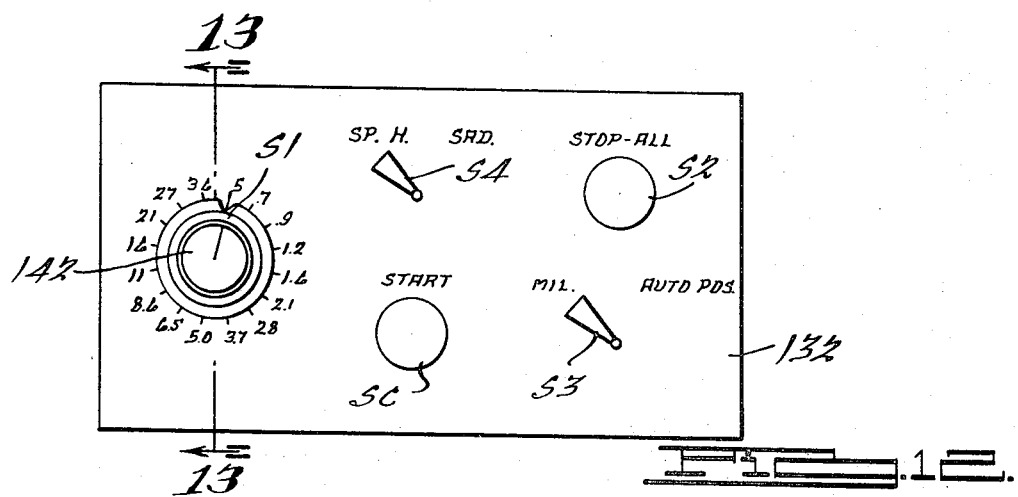
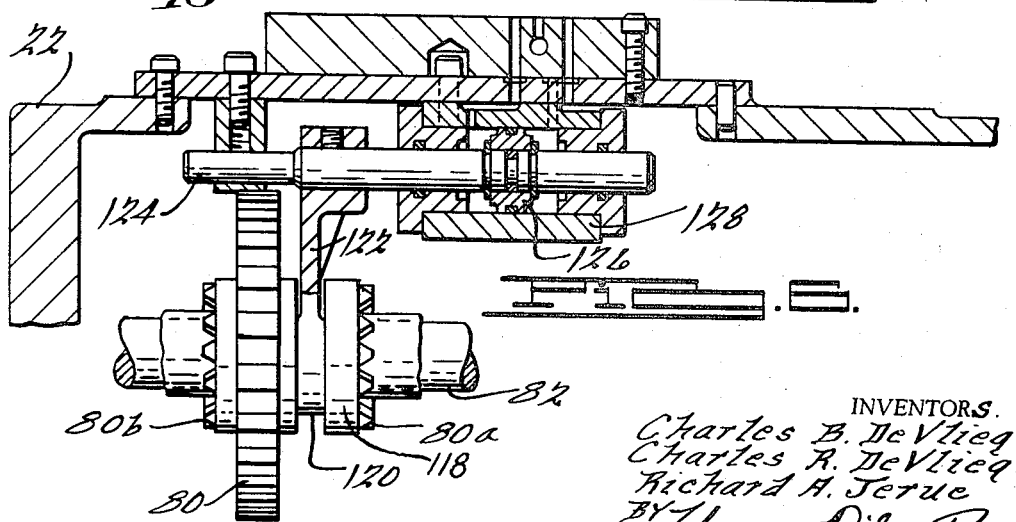
INVENTORS.
Charles B. DeVlieg
Charles R. DeVlieg
Richard A. Jerue
BY
Carnes, Dickey & Pierce
ATTORNEYS.

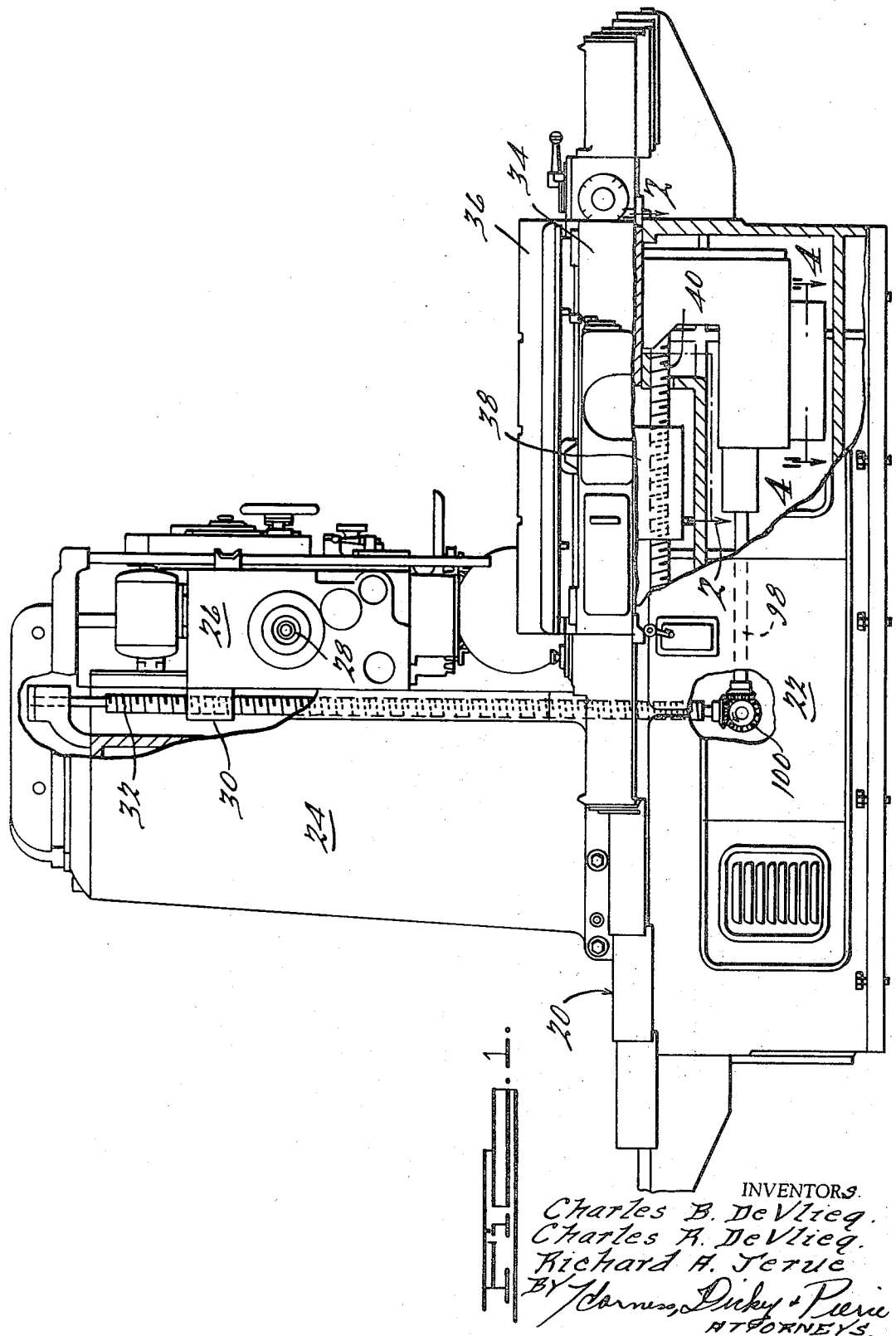

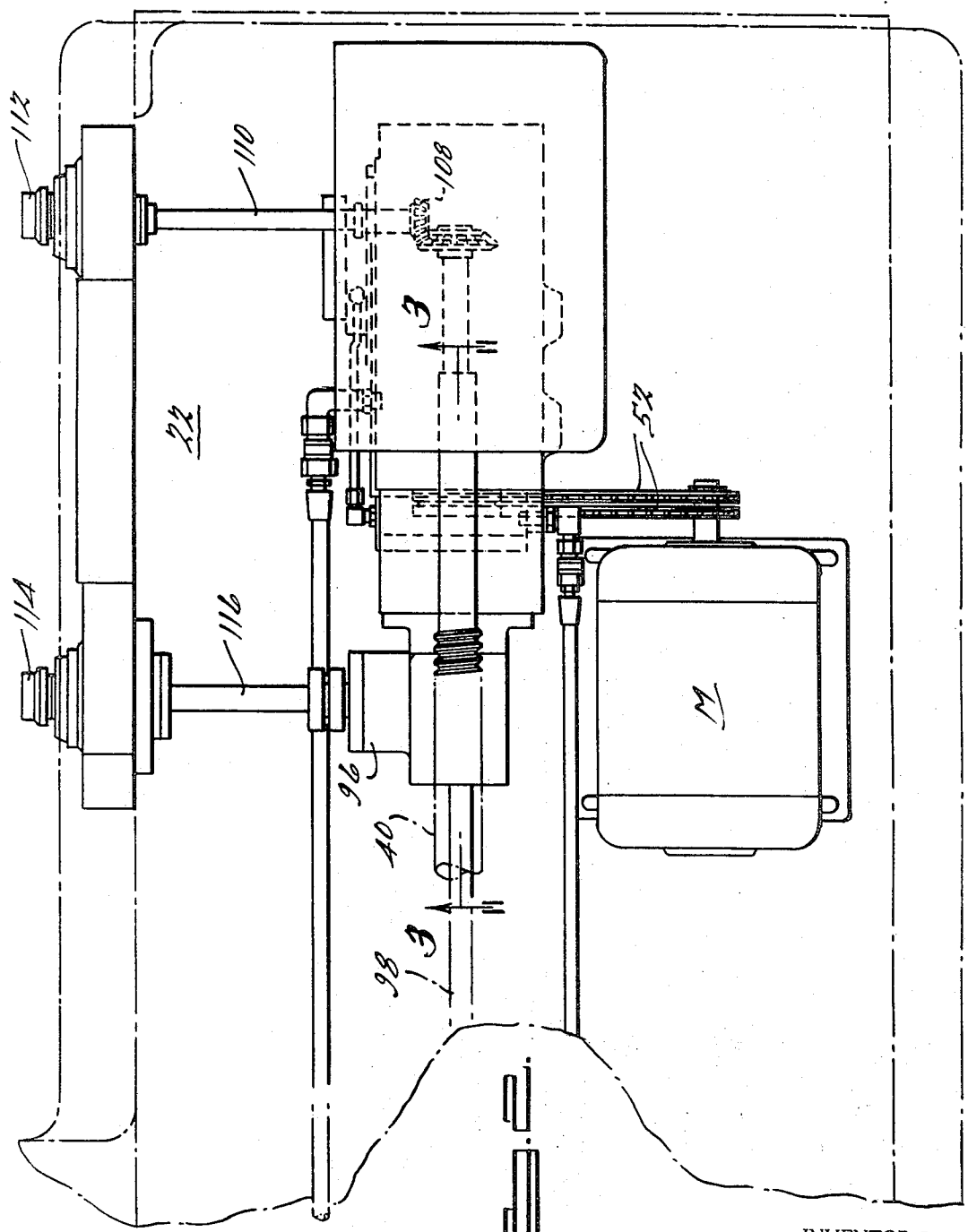

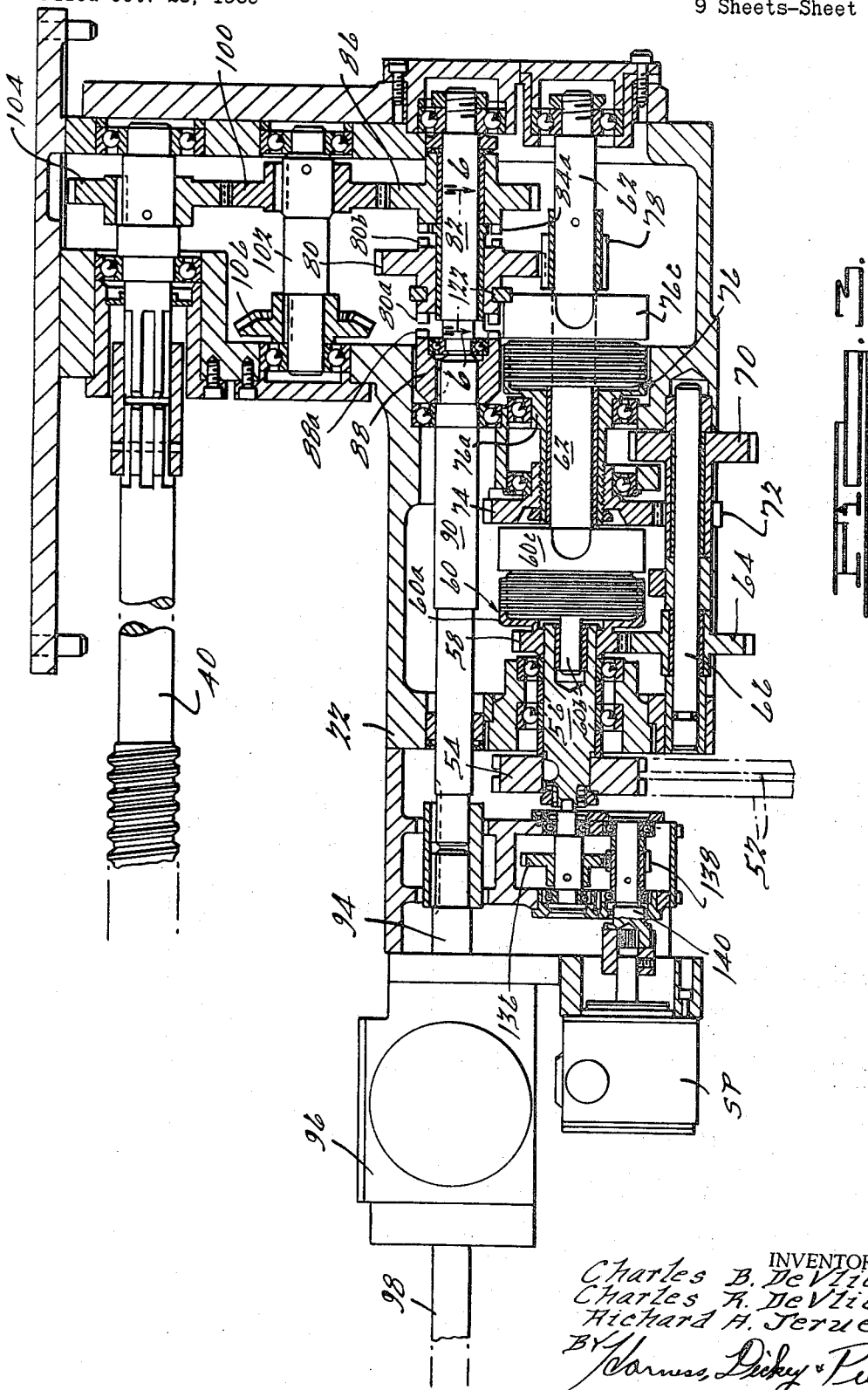

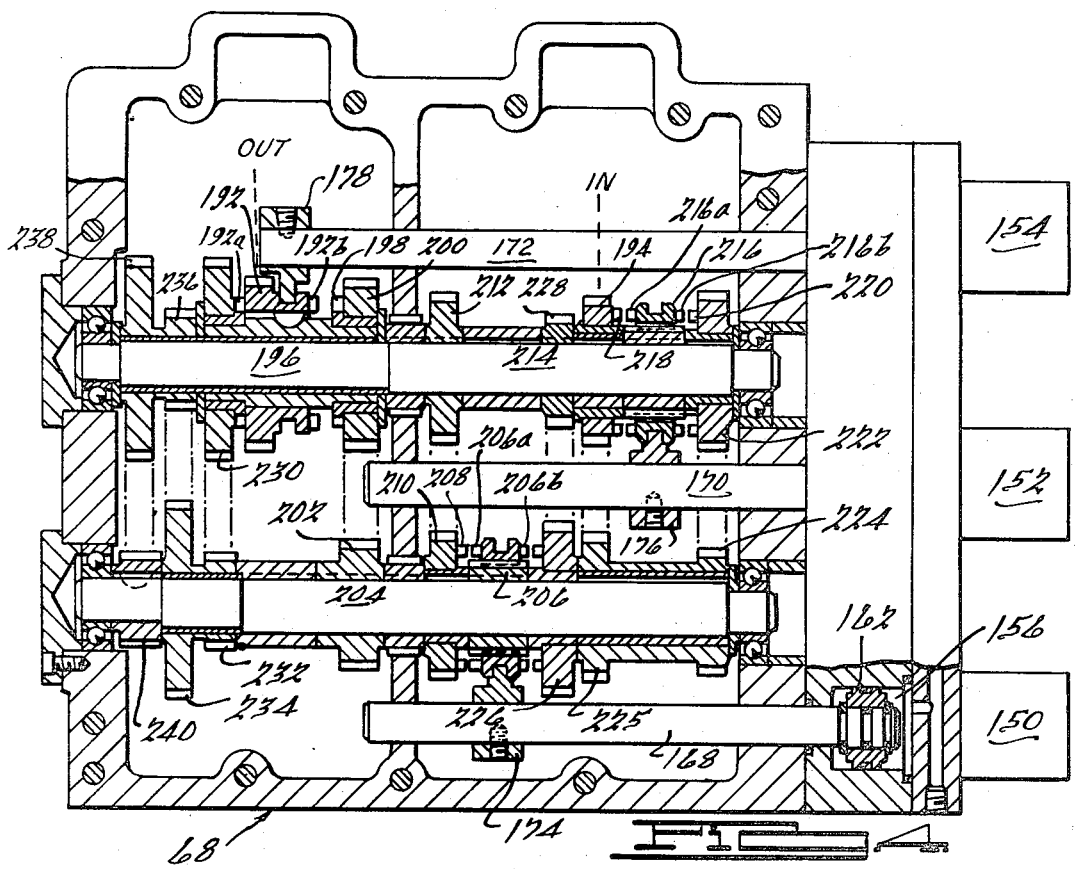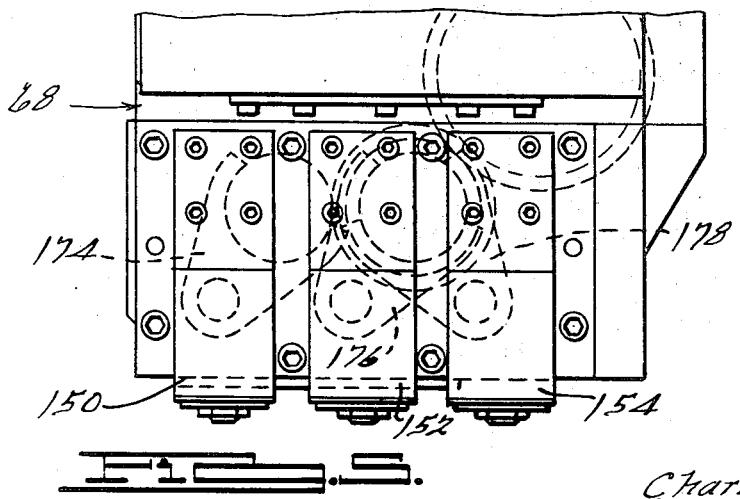

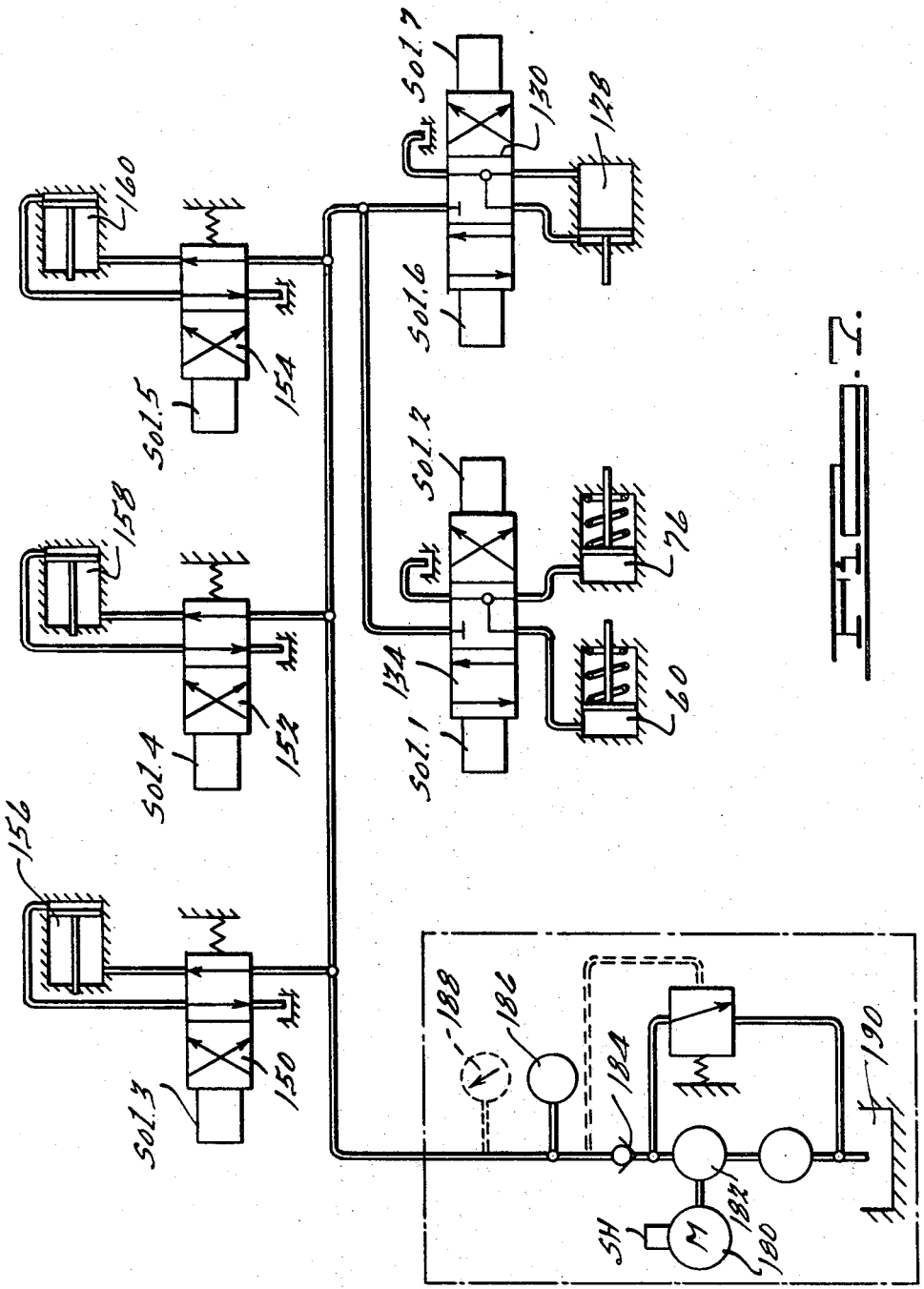

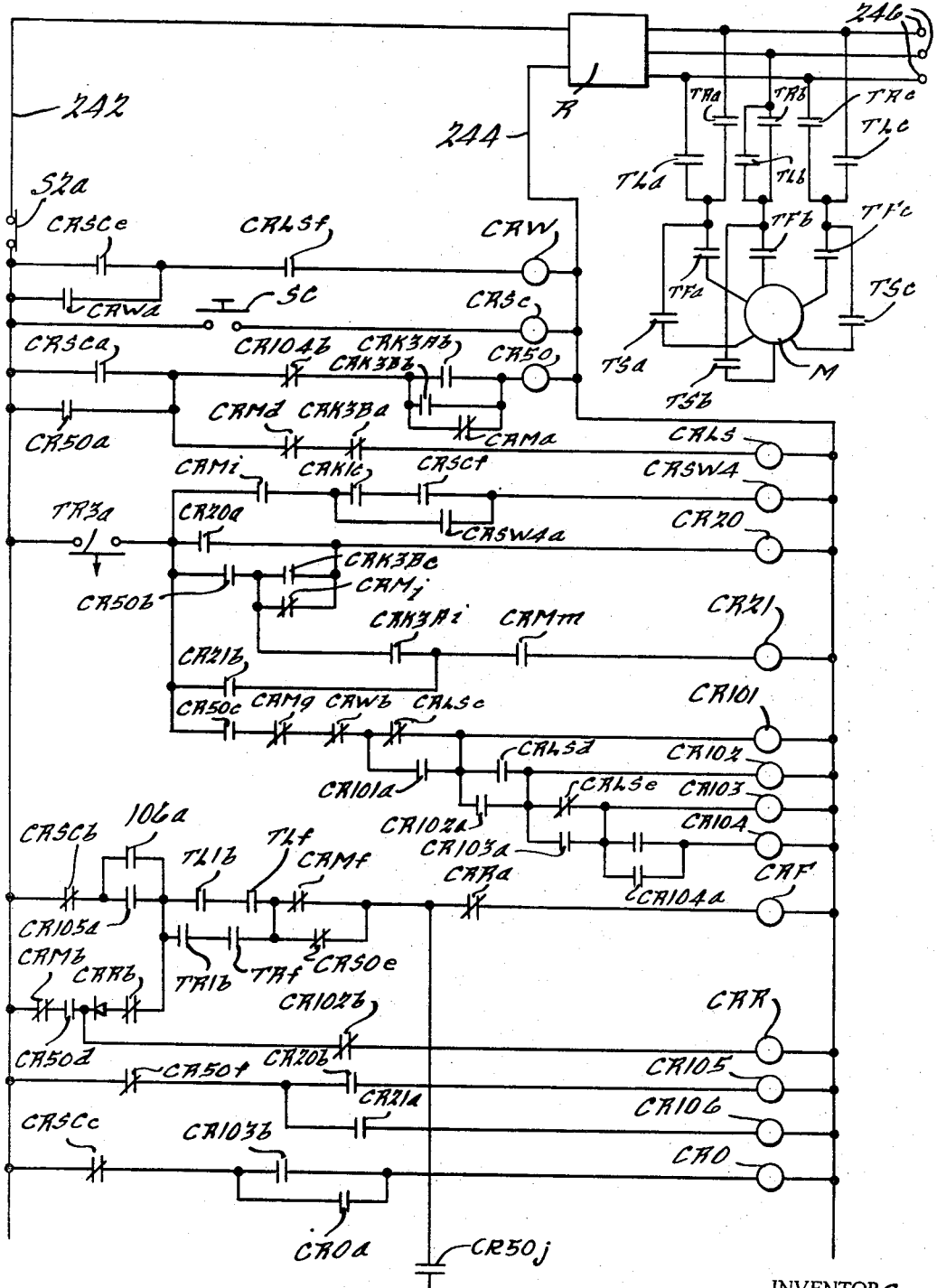

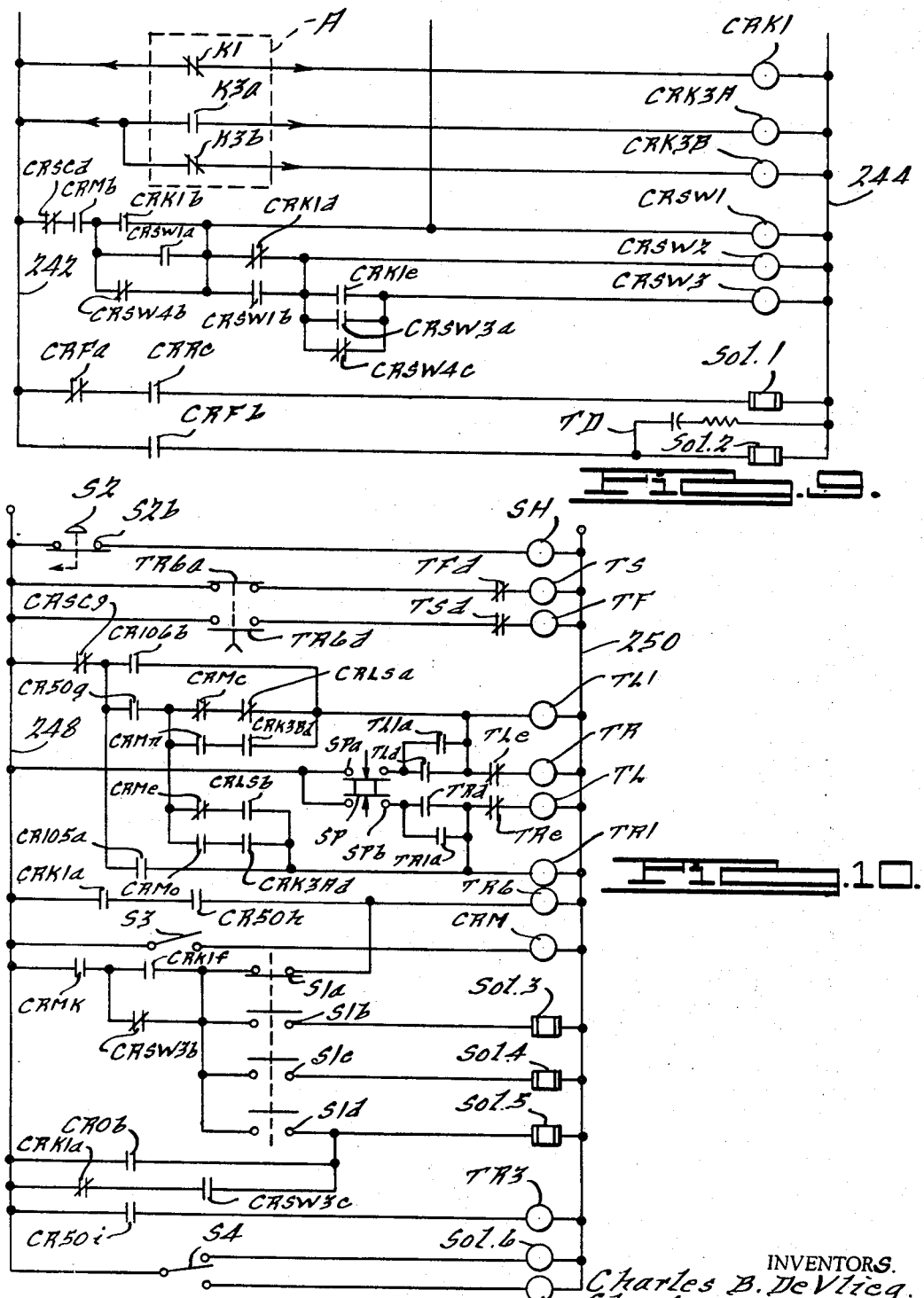

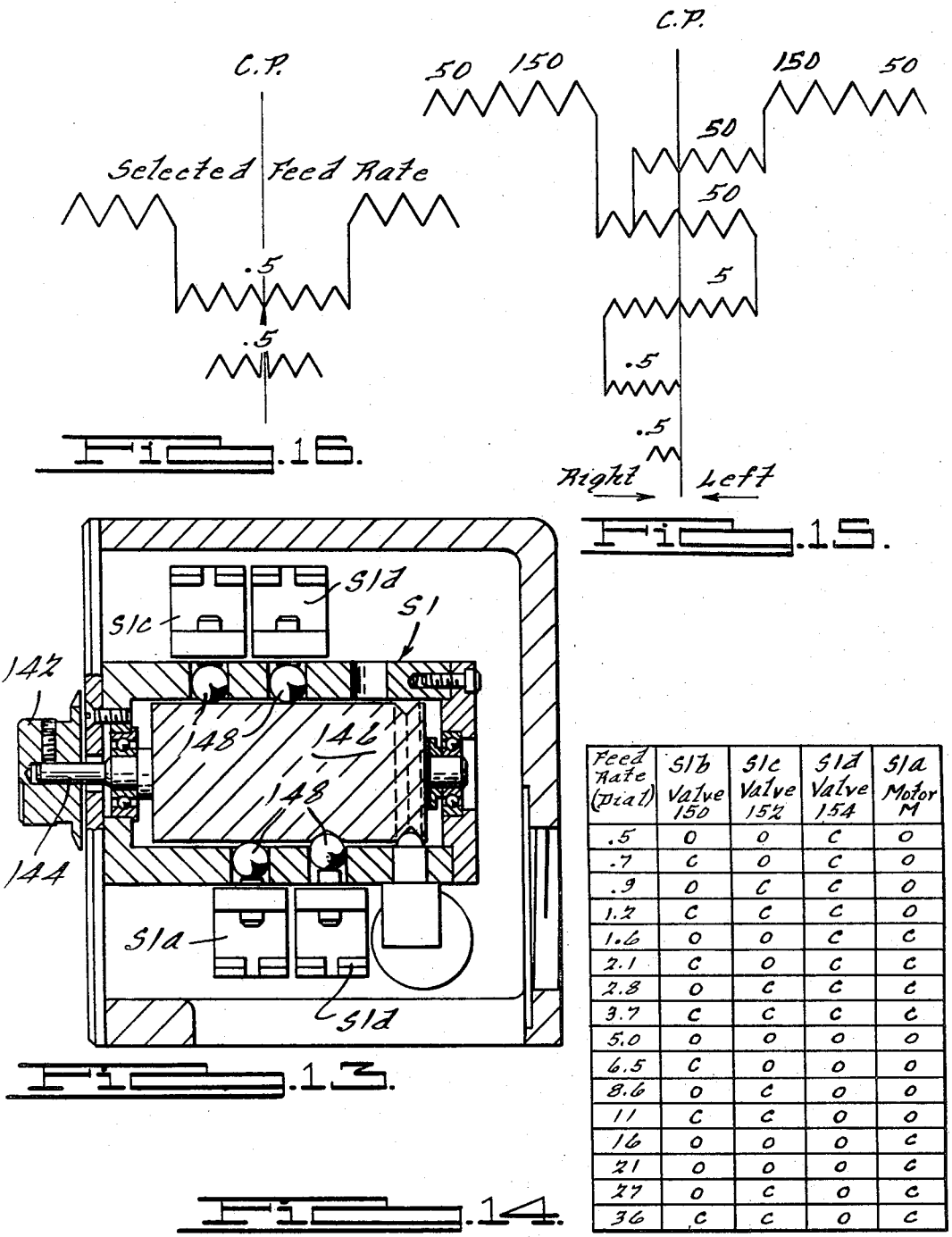

United States Patent Office 3,417,662
Patented Dec. 24, 1968

3,417,662
POSITIONING MECHANISM FOR
MACHINE TOOLS
Charles B. De Vlieg and Charles R. De Vlieg, Bloomfield Hills, and Richard A. Jerue, Birmingham, Mich., assignors to De Vlieg Machine Company, Royal Oak, Mich., a corporation of Michigan
Continuation-in-part of application Ser. No. 485,506, Sept. 7, 1965. This application Oct. 23, 1965, Ser. No. 511,274
4 Claims. (Cl. 90—16)

ABSTRACT OF THE DISCLOSURE

A machine tool having electrically controlled clutches disposed in the drive train between the drive motor and a work or tool support. These clutches can be used for selecting a gear path through which power will be delivered to the support and they are also effective for disengaging the motor from the support at certain critical times in the positioning cycle. At such times the support is isolated from the inertia of the motor. The machine tool is further equipped with fluid power operated gear shifters for remotely establishing speed settings for the support.

---

This invention relates to machine tool positioning mechanisms for moving a work or tool support of the machine tool to a selected position. This application relates to subject matter disclosed in my prior copending application Ser. No. 485,506, filed Sept. 7, 1965, and is a continuation in part thereof, and now abandoned.

In United States Patent No. 2,561,346, there is illustrated an automatic positioning means for machine tool supports and other supports in which the work or tool support is moved back and forth or successively reversed in arriving at the final intended position. Upon each successive reversal the speed at which the support is driven is reduced. The apparatus disclosed in this patent has proven to be of great value and has enabled the positioning of work and tool supports with a degree of accuracy theretofore unobtainable. Despite the extreme accuracy of the apparatus disclosed in this prior patent, it has been found that this apparatus does suffer from certain difficulties which can affect the accuracy of the machining operation. In particular, it has been found that such prior apparatus is highly dependent upon the operation of the electric drive motor and that variations in line voltage and the temperature of the motor can affect the repetitive accuracy of the positioning operation. Variations in the electrical characteristics of the drive motor have been particularly noticeable in larger machines utilizing large electric motors. It is, therefore, an object of the present invention to provide a machine tool positioning mechanism which is of a highly accurate nature and which is relatively immune to inaccuracies resulting from the electrical characteristics of the drive motor and variations in the electric current supplied to the drive motor.

It is another object of the present invention to provide a positioning mechanism for machine tools or the like, which will permit the automatic and remote selection of feed speeds for the movement of the work or tool support member.

It is another object of the present invention to provide a positioning mechanism for machine tools or the like in which the electric drive motor may be disengaged from the member being driven to render the degree of travel of the driven member after disengagement immune from the inertia of the drive motor.

It is another object of the present invention to provide a machine tool positioning mechanism which will operate in a faster cycle than has heretofore been possible.

It is another object of the present invention to provide a machine tool positioning mechanism which will enable program milling to move a tool or work to a preselected position at a desired feed rate and to cause the work or tool to come to rest in the preselected position in an accurate manner.

These and other objects of the present invention will become apparent from the following detailed description taken in conjunction with the accompanying drawings, wherein:

FIGURE 1 is a front elevational view with parts broken away of a machine tool having a positioning mechanism according to the present invention;

FIG. 2 is an enlarged sectional view of a portion of the structure illustrated in FIG. 1 taken generally along the line 2—2 thereof;

FIG. 3 is a sectional view illustrated in FIG. 2 taken generally along the line 3—3 thereof;

FIG. 4 is an enlarged sectional view of the structure illustrated in FIG. 1 taken generally along the line 4—4 thereof;

FIG. 5 is a reduced scale end view of the structure illustrated in FIG. 4;

FIG. 6 is an enlarged sectional view with parts broken away of the structure illustrated in FIG. 3 taken generally on the line 6—6 thereof;

FIG. 7 is a diagrammatic view of the hydraulic mechanism used with the structure of FIGS. 1 to 7;

FIGS. 8, 9, and 10 are schematic views of the electrical control circuitry for the machine, FIG. 9 being readable in conjunction with FIG. 8 by placing it at the bottom of FIG. 8;

FIG. 11 is a schematic view of the position measuring apparatus used with the machine;

FIG. 12 is a view of a control panel for the machine;

FIG. 13 is an enlarged sectional view of the structure of FIG. 12 taken along the line 13—13 thereof;

FIG. 14 is a chart showing the positions of various combinations for contact positions of the switch S1 to produce various feed rates; and FIGS. 15 and 16 are diagrammatic representations of the various positioning cycles of the machines.

Referring now to the drawings and particularly to FIG. 1, a machine tool 20 is illustrated in the form of a horizontal boring and milling machine. The machine 20 includes a frame having a bed 22 and a vertical column 24. The column 24 serves to support a spindle head 26 carrying a tool holding and driving spindle 28. The spindle head incorporates an integral nut 30 which threadably engages a vertical lead screw 32. The vertical lead screw is journaled for rotation about a fixed axis and is held against movement along said axis. Accordingly, rotation of the vertical lead screw 32 is operable to move the spindle head 26 in a vertical rectilinear direction. Of course, the spindle head 26 is provided with surfaces engageable with ways (not shown) on the column 24. A saddle 34 is supported on ways (not shown) on the base 22 and a table 36 is mounted on the saddle 34. The work (not shown) to be machined is fixed on the table so as to be engageable by a tool (not shown) supported and driven by the spindle 28. The saddle 34 is movable in a horizontal rectilinear direction by virtue of the fact that it incorporates an integral nut 38 threadably engageable with a horizontal lead screw 40 rotatably supported by the bed 22.

The present invention is particularly concerned with the mechanism by which the lead screws 32 and 40 are driven in rotation so as to advance either the spindle head 26 or the saddle 34 to a predetermined position. The position to which it is desired to move the spindle head 26 or the table 34 may be established and sensed by a variety of different measuring or position sensing devices or systems, and the measuring system per se forms no part of the present invention. A position to which it is desired to move the spindle head 26 or the saddle 34 will be hereinafter referred to as the "command position." Exactly how the command position is selected and the means for sensing the relative position of the saddle 34 or spindle head 26 with respect to such command position may vary in accordance with a variety of available measuring systems. One such system is shown in United States Patent No. 3,011,113. Another suitable system employing a position measuring transformer is manufactured by Farrand Controls, Inc., Valhalla, N.Y. A system of this general type is diagrammatically illustrated in FIG. 11. This system utilizes a scale 42 in the form of secondary transformer windings which can be mounted on the bed 22. A so-called slider 44 in the form of primary windings may be mounted on the saddle 34 adjacent the scale 42. If desired, the positions of the slider 44 and scale 42 may be reversed. A similar slider and scale (not shown) are mounted on the column 24 and spindle head 26. The slider 44 and scale 42 are connected to a control console. A having manually adjustable knobs 46. By rotations of the knobs a position to which it is desired to move the saddle may be selected and this dimension will appear in windows 48.

The windings of both the slider 44 and scale 42 are divided into coarse, medium, and fine sets having sine and cosine winding sections. The rotation of the knobs 46 operates switches connected to the windings to provide selected sine-cosine analogue data. In other words, rotation of the knobs 46 changes the output of the alternating current delivered to the primary windings of the slider 44. Each voltage is selected to correspond with a given angle or location on the sinusoidal wave of its corresponding secondary winding of the scale 42. The induced voltages in the secondary windings are compared to the input voltages and when such voltages are exactly equal, a "null" is produced and the saddle will be in the selected "command position." When the saddle 34 is to the left of the command position, the output voltage will effect closure of contacts K3b; when to the right of the "command position" it will effect closure of contacts K3a; and when passing within a selected range of the "command position" it will effect opening of contacts K1. A null meter 50 on the console A indicates the presence of the saddle in the command position or its location to the right or left of the command position.

The range within which the contacts K1 will open may be adjusted. For example, when the saddle approaches within three inches of the command point, the contacts K1 may be caused to close. The particular electronic circuit by which the contacts K1, K3a and K3b are caused to open and close is extremely complex and inasmuch as such circuitry forms no part of the present invention per se, this circuitry is not disclosed. The invention is concerned with the particular mechanism by which the saddle 34 or the spindle head 26 is moved to, and ultimately brought to rest in, the command position and not with the structure by which the location of the saddle with respect to the command position is sensed. It is sufficient to say that the contacts K1 will open when the saddle is within a predetermined range of the command position and that the contacts K3a and K3b will reverse their positions as the saddle moves across the command position.

In describing the operation of the present invention, reference is made to the movement of the saddle 34. It will be apparent, however, that the same method of operation may be utilized to position the spindle head 26. This is accomplished by the simple shifting of gears to cause the drive motor to rotate the vertical lead screw 32 rather than the horizontal lead screw 40. The arrangement for shifting gears will be subsequently described.

In moving the saddle 34, the general object is to advance the saddle to its ultimate position as efficiently as possible and yet leave the saddle in the ultimate desired position as accurately as possible. It will be appreciated that when a heavy body such as the saddle 34 is moved until its location is a command position is sensed, its momentum may cause it to override the command position even though operation of the drive motor is discontinued. In recognition of this fact the mechanism of the present invention provides means for successively reducing the speed with which the support member is moved either as it repetitively moves back and forth across the command position, or as it gradually approaches the command position, depending upon whether an automatic positioning cycle or milling cycle is selected.

Reference is now made to FIGS. 2–5 in which it will be seen that a drive motor M of the machine produces rotation of a chain 52 which is connected to a sprocket 54 keyed to a shaft 56 journaled in the bed 22. At the end of the shaft 56 opposite from the sprocket 54 is a spur gear 58 and a housing 60a of an hydraulic clutch member 60, both rotatable with the shaft 56. The housing 60a serves to journal a central shaft 60b of the clutch 60 which is integral with a clutch portion 60c fastened to one end of a shaft 62. When the clutch 60 is engaged the housing 60a will drive the clutch portion 60c and the shaft 62. Alternatively, the shaft 62 can be driven by means including the gear 58 which is engagebale with a spur gear 64 freely rotatable on a shaft 66. The gear 64 drives through a reduction feed drive gear box 68 which is operable at its output to rotate a spur gear 70, also freely rotatable on the shaft 66. The gear 70 is integrally formed with a spur gear 72 which drives a spur gear 74 rotatably mounted on the shaft 62. The gear 74 is corotatable with the housing 76a of a hydraulic clutch 76. The clutch 76 also has a portion 76c which is made fast to the shaft 62 for the purpose of driving the shaft 62 in rotation when the clutch 76 is engaged. A spur gear 78 is keyed to the shaft 62 and drives a spur gear 80 which is freely rotatable on a shaft 82. Furthermore, the gear 80 is axially shiftable on the shaft 82 and is provided with axially extending teeth 80a on its left-hand side and axially extending teeth 80b on its right-hand side. The teeth 80b are adapted to mesh with axially extending teeth 84a of a gear 86 also freely rotatable on the shaft 82. The teeth 80a are engageable with axially extending teeth 88a of a driven member 88 keyed to the right-hand end of a journalled shaft 90. Thus, when the teeth 80a are engaged with the teeth 88a the shaft 90 is driven in rotation. The shaft 90 is connected to a shaft 94 of a gear box 96 having an output shaft 98. By reference to FIG. 1 it will be seen that output shaft 98 is operable through bevel gearing 100 to drive the vertical lead screw 32.

As will be apparent from the subsequent description, when the clutch 60 is engaged, the clutch 76 is always disengaged, and vice versa. The engagement of the clutch 60 and the disengagement of the clutch 76 produce a direct drive from the shaft 56 to the shaft 62 making no use of the speed reduction provided by the gear box 68. Under such circumstances, the clutch housing 76 will freely rotate on the shaft 62 without performing any driving function. On the other hand, when the clutch 76 is engaged and the clutch 60 is disengaged the driving connection between the shaft 56 and the shaft 62 is through the gearing of the gear box 68 and the rate of rotation of the shaft 62 with respect to the shaft 56 will be determined in accordance with the relative engagement and disengagement of the various gears of the gear box 68. As has been previously mentioned, the gear 80 is axially shiftable on the shaft 82. The function of the gear 80 for the purpose of driving the vertical lead screw 32 has been described. When the gear 80 is shifted to the right so that its teeth 80b engage the teeth 84a of the gear 86, the gear 86 will be driven in rotation and it, in turn, will drive a gear 100 mounted on a shaft 102. The gear 100 drives a gear 104 mounted on the end of the horizontal lead screw 40 to rotate said lead screw.

It will be seen that a bevelled gear 106 is also mounted on the shaft 102. As shown in FIG. 2 this gear is engageable with a bevel gear 108 carried at the end of a shaft 110 having an externally accessible socket member 112. The socket member 112 is adapted to be fitted with a hand wrench (not shown) by means of which the horizontal lead screw may be manually rotated. Similarly, a fitting 114 is adapted to receive a hand wrench. The fitting 114 is connected to a shaft 116 which is engageable with the gear box 96. By this means rotation of the vertical lead screw 32 may be accomplished manually by the machine tool operator.

It should be mentioned at this point that it is possible to disengage both the clutches 60 and 76 so as to completely isolate the motor M from either the horizontal lead screw 40 or the vertical lead screw 32. It has been found that the motor M (particularly in the case of large machine tools) possesses substantial inertia which tends to drive the saddle 34 or the spindle head 26 beyond its intended position even after the motor M has been de-energized. By disengaging the motor M from the saddle 34 by the disengagement of the clutches 60 and 76 it is possible to permit the saddle to come to rest in a reliable and quicked manner than has heretofore been possible.

Reference is now made to FIG. 6 in which is disclosed the mechanism by which the gear 80 is axially shiftable on the shaft 82. It will be seen that the gear 80 incorporates an integral circular boss 118 having an annular external groove 120 adapted to receive the arms of a shifter fork 122. The fork 122 is fastened to the end of a piston rod 124 adapted to be actuated by a piston 126 operatively positioned within a hydraulic cylinder 128. The hydraulic cylinder is controlled by a valve 130 which is, in turn, operated by a pair of solenoids, Sol 6 and Sol 7. When hydraulic fluid is admitted to the cylinder 128 in one direction, the gear 80 will be shifted to produce engagement of the teeth 80a with the teeth 88a. When hydraulic fluid is admitted to the cylinder 128 in the other direction, the gear 80 will be shifted to produce engagement of the teeth 80b with the teeth 84a.

FIG. 12 represents a control panel 132 of the machine 20. On this panel is mounted a switch S4 which, by reference to FIG. 10, will be seen to control the operations of Sol 6 and Sol 7. By shifting the switch S4 to one position, Sol 6 will be actuated to cause the gear 80 to drive the vertical spindle 32. When the switch S4 is adjusted to the other position to energize Sol 7, the spool of the valve 30 will be shifted in a manner causing the gear to be adjusted to the right and thereby drive the horizontal lead screw 40.

Referring to FIG. 7, the clutches 60 and 76 are diagrammatically illustrated as arranged for pressurization by hydraulic fluid delivered through a valve 134. The spool of the valve 134 is adapted to be shifted by a pair of solenoids identified as Sol 1 and Sol 2. In connection with the hydraulic clutches 60 and 76, we have found that clutches suitable for the intended purpose are manufactured by E. C. Styberg Engineering Company, Inc., Racine, Wis., and are of the type known as "Multiple Disk, Hydraulic Model FT" clutches. Engagement and disengagement of the clutches is, of course, effected by the delivery of hydraulic fluid pressure thereto.

In connection with the operation of the various hydraulic cylinders, it will be seen that a motor 180 operates an hydraulic pump 182 for the purpose of pumping hydraulic fluid past a check valve 184 to the various hydraulic cylinders. An hydraulic accumulator 186 assures an instantaneous full supply of hydraulic pressure for the immediate actuation of the various pistons in response to valve actuation. A pressure gage 188 enables the operator to determine the existence of ample pressure. The hydraulic fluid is pumped from a reservoir 190. The motor 180 is turned off and on through a solenoid SH.

The machine of the present invention is provided with means for sensing any appreciable rotation of the drive shaft of the motor M. Such means includes a plugging switch SP (FIG. 3) which is driven by the shaft 56 through intermediate gears 136 and 138 and a drive shaft 140. The plugging switch SP is of a well-known type; for example, the type known as Bulletin 808 Zero Speed Plugging Switch, manufactured by the Allen Bradley Company, Milwaukee, Wis. Such a plugging switch incorporates a magnetically coupled actuator which opens and closes contacts SPa and SPb (FIG. 10) in accordance with the direction of rotation of the motor.

Referring now to FIGS. 12 and 13, a switch S1 is shown for selecting the gearing of the feed box 68. The switch S1 has a knob 142 which is fastened to the end of a shaft 144 of a cam member 146. The cam member is engageable with a plurality of balls 148 which operate switch contacts S1a, S1b, S1c, and S1d. These contacts are shown also in FIG. 10 and they serve to control Sol 3, Sol 4 and Sol 5, as well as a time delay relay TR6. Sol 3 actuates a valve 150, Sol 4 actuates a valve 152, and Sol 5 actuates a valve 154. The valves 150, 152 and 154 are operatively connected to a plurality of hydraulic cylinder bores 156, 158 and 160, respectively (FIG. 4). The bores 156, 158 and 160 house pistons 162, 164 and 166, respectively, which in turn operate piston rods 166, 170 and 172. Piston rod 168 carries a shifter fork 174; the piston rod 170 carries a shifter fork 176; and the piston rod 172 carries a shifter fork 178. As will be subsequently explained by a detailed explanation of the feed box 68, the shifter forks 174, 176 and 178 serve to shift gearing within the gear box to produce variable feed rates. By means of selectively shifting such gearing and also by the selection of the speed motor M, sixteen different feed rates may be obtained. In other words, the gear box 68 has eight different speeds and by using two motor speeds, the shaft 62 may be driven at sixteen different speeds through the gear box 68. In addition, the shaft 62 may be driven at two faster speeds by direct drive from the shaft 56 and without the use of the gear box 68.

FIG. 14 shows the position of the contacts of the switch S1 when the knob 142 is pointed to the different feed rates indicated on the face of the panel 132. The letter O stands for the fact that the contacts are open and the letter C stands for the fact that the contacts are closed. In the column headings the operative mechanism controlled by each set of contacts is indicated.

Referring now to FIG. 4, it will be seen that the feed drive gear box includes an output gear 192 meshing with the gear 64 and with an input gear 192 meshing with the gear 70. The output gear 192 is freely rotatable on a shaft 196 and is axially shiftable on the shaft 196 by means of the shifter fork 178 which engages the gear 192 in an annular outer peripheral groove thereof.

The input gear 194 meshes with a spur gear 225, which is integrally formed with a spur gear 224. The combined gears 225 and 224 are freely rotatable on a shaft 204. The gear 224 meshes with and drives a spur gear 222 freely rotatable on the shaft 214. Splined on the shaft 214 between the gears 194 and 222 is a dog clutch driving sleeve 216. The sleeve 216 has axially extending dog teeth 216a on its left-hand side matable with dog teeth 218 on the gear 194, while axially extending dog teeth 216b are formed on the right-hand side of the sleeve 216 and will mate with similar teeth 220 on the gear 222. The arrangement is such that when the teeth 216a and 218 are in engagement, the teeth 216b and 220 are disengaged, and vice versa.

The sleeve 216 is engaged in a peripheral annular groove thereof by the shifter fork 176. By this means the path through which the shaft 214 is driven may be selected. When the sleeve 216 is moved to the left the gear 194 will directly drive the shaft 214 and when the sleeve 216 is moved to the right the shaft 214 will be driven through reduction gearing including the gears 225, 224 and 222.

Keyed on the shaft 214 and driven thereby is a pair of spur gears 212 and 228. The gear 212 drives a gear 210 freely rotatable on the shaft 204, and the gear 228 drives a gear 226, also freely rotatable on the shaft 204. Positioned between the gears 210 and 226 is a dog clutch driving sleeve 206 which is splined on the shaft 204 to drive this shaft. The sleeve is engaged in an annular peripheral groove thereof by the shifter fork 174 and when this sleeve is moved to the left by the fork 174 a plurality of axially extending dog teeth 206a on its left side will mate with similar dog teeth 208 of the gear 210. When the sleeve 206 is moved to the right, the teeth 208 and 206a are disengaged and a plurality of axially extending dog teeth 206b on the right-hand side of the sleeve 206 are engaged with similar dog teeth on the gear 226. The relationship of the gears 228 and 226 is such as to give a greater speed reduction when the shaft 204 is driven through them than when driven through the gears 212 and 210. A selection is made between these two sets of gears by the movement of the shifter fork 174.

The shaft 204 is effective to drive a pair of spur gears 202 and 240, both of which are keyed to it. The gear 202 drives a spur gear 200 which is freely rotatable on the shaft 214 on the right-hand side of the output gear 192. The gear 240 drives a spur gear 238 which is integrally formed with a gear 236 positioned at its side. The combined gears 238 and 236 are freely rotatable on the shaft 214 and drive a gear 234 freely rotatable on the shaft 204. The gear 234 is integrally formed with a gear 232 which drives a gear 230 freely rotatable on the shaft 214 to the left of the output gear 192.

The output gear 192 is freely rotatable on the shaft 214 and is adapted to be selectively driven by either the gear 200 or the gear 230. For this purpose the gear 192 has axially extending dog teeth 192 formed on its left-hand side which are engageable with similar teeth formed on the gear 230. Formed on the right-hand side of the gear 192 are a plurality of axially extending dog teeth 192b engageable with similar teeth 198 of the gear 200. The gear is engaged in an annular peripheral groove thereof by the shifter fork 178. By movement of the shifter fork 178 two different paths of power transmission from the shaft 204 to the gear 192 can be selected.

It will be apparent that the feed drive gear box 68 affords eight different combinations of power transmission paths. Coupled with the use of a two-speed drive motor, sixteen different feed speeds are possible, as is shown in FIG. 14.

Whenever Sol 3, Sol 4, and Sol 5 are energized, they are effective to move their associated shifter forks to the left and when they are not energized their associated shifter forks will be in their right-hand positions. Accordingly, the position of each shifter fork (174, 176, 178) necessary to produce a given feed rate may be determined by referring to FIG. 14 in conjunction with FIG. 4. For example, for the 36 inches per minutes speed of the gear box the shifter forks 174 and 176 are moved to the left, while the shifter fork 178 is moved to the right. For the slowest or .5 inch per minute speed, this situation is exactly reversed.

It should be mentioned that each of the shifter forks 174, 176 and 178, as well as the shifter fork 122, is provided with a circular cylindrical recess between the bifurcated arms thereof, which conforms to the annular groove of its associated gear or driving sleeve. By this means the shifter fork is able to remain in engagement with its associated gear or driving sleeve while the same is driven in rotation. It is therefore unnecessary to disengage the shifter forks from their associated structure during power transmission. The axially extending or dog teeth of the various gears and drive sleeves, which have been heretofore mentioned, will engage and disengage in an extremely rapid and smooth manner by means of the structure illustrated herein.

OPERATION AND ELECTRICAL CIRCUITRY

A variety of different control circuits can be employed in connection with the positioning mechanism of the present invention. For example, manual controls may be incorporated for actuating the drive motor in either direction to move the spindle housing up and down and the saddle right or left. Such individual controls may include suitable contacts for deenergizing the solenoids 1 and 2 simultaneously with the deenergization of the drive motor. By this means the momentum of the motor will not attempt to carry the saddle 34 or spindle head 26 far beyond the point at which the operator attempts to terminate member movement. The design of such manual controls will be readily apparent to those skilled in the art, based upon the foregoing description. We have illustrated herein, however, suitable circuitry by means of which the saddle and spindle housing may be advanced to a preselected position in either of two different cycles. One cycle is termed "automatic positioning" and according to such cycle the saddle 34 or spindle head 26 is moved repetitively back and forth across the command position, at successively reduced speeds. According to a second "milling" cycle, the member to be moved is advanced to the command position without overrunning the command position. During this cycle, the member is slowed down in its rate of movement as it approaches the command position. In determining the location of the command position and the relationship of the tool or work support member to the command position, the control console A is operative to open and close the previously mentioned contacts, K1, K3a and K3b, illustrated in FIG. 8. For purposes of illustration, reference will be made to the saddle and the expressions "right and left" will be used to refer to the movement of the saddle. However, the same sequence of operation is applicable to the spindle head and the same description would apply to the spindle head 26 if "up" and "down" were substituted for "right" and "left."

Prior to causing automatic positioning of the machine, the operator must first determine whether or not a milling cycle or an automatic positioning cycle is desired. During a milling cycle, it is presumed that a milling cutter will be utilized in conjunction with the spindle 28 and that the cutter will be removing metal during movement of the saddle 34 or spindle head 26. Accordingly, the movement of such member is continuous in one direction. The automatic positioning cycle is used primarily to bring the work or tool support member to a selected location where it remains stationary during a boring, drilling or other machining operation. The member is advanced to the command position and then is repetitively cycled across the command position at successively reduced speeds in order to ultimately leave the support member on the command position with minimal possibilities of error. Accordingly, the operator must position the switch S3 to either the "milling" or "automatic positioning" and thereby open or close the contacts of switch S3. Furthermore, the operator must position switch S4 to select whether the spindle head 26 or the saddle 34 will be moved. If the milling cycle has been selected, then it is also necessary to adjust the switch S1 to select the feed speed at which the support member to be moved will travel. The initiation of the selected cycle is accomplished by temporary depression of a starter button or switch SC. In the event of an emergency, the entire operation of the machine can be interrupted by depression of the button of an emergency stop switch S2.

Firstly, the operation of the control circuitry for the purpose of accomplishing "automatic positioning" when the saddle is positioned to the left of the command position will be described. A somewhat different sequence of operation occurs when the saddle is located to the right of the command position, and this will be subsequently described. It will also be assumed that the saddle is located at a distance away from the command point which is greater than or equal to the preset adjustable range at which the contacts K1 open. For example, the contacts K1 may be set to open when the saddle approaches within three inches of the command point. Such distance may be termed the "anticipation point." As indicated previously, the contacts K3a will be open when the saddle 34 is to the left of the command position, and the contacts K3b will be open when the saddle is to the right of the command position. The contacts are coupled so that when one is open the other is closed. The positions of said contacts are reversed when the saddle crosses the command position.

Initiation of the cycle is produced by manual depression of an automatic starting switch SC to complete a circuit through a relay coil CRSC between a pair of conductors 242 and 244. A direct current potential is established between the conductors 242 and 244 by a rectifier R powered by a three-phase alternating current source 246. Momentary energization of relay CRSC causes its contacts CRSCa to close for the purpose of energizing a solenoid CR50 through normally closed contacts CRMa and CR1046. In this connection, it will be noted that contacts CRMa are closed because of the fact that relay CRM has been deenergized by the positioning of cycle selector switch S1. When the switch S1 is set for the automatic positioning cycle, its contacts are opened. When it is set for the milling cycle, its contacts are closed. The relay CRM is energized by an alternating current circuit between a pair of conductors 248 and 250 which derives its potential from the power source 246. When the switch SC is released, its contacts will reopen, but a holding circuit is established for relay CR50 by means of its contacts CR50a. The relays which control the direction of operation of the motor M are relays TR and TL (FIG. 10) and the energization of these relays is prevented prior to the time that the switch SC is released by means of normally closed contacts CRSCe. Similarly, premature energization of relays CRF and CRO (FIG. 8) is prevented by normally closed contacts CRSCb and CRSCc. The energization of relay CR50 causes closure of its contacts CR50i to energize a solenoid TR3 (FIG. 10). After a short delay, its contacts TR3a close to establish an energizing circuit for a relay CR20 (FIG. 8). A holding circuit for relay CR20 is established by closure of contacts CR20a. A relay CRR is also energized through normally closed contacts CRMb and CR102a and contacts CR50d. A relay CRKi (FIG. 9) is also energized through the normally closed contacts K1. Its contacts CRK1a then close and an energizing circuit for a relay TR6 (FIG. 10) is established through said contacts and contacts CR50h. The contacts K3b being closed as a result of the position of the saddle to the left of the command position, an energizing circuit for a relay CRK3b (FIG. 9) is established.

If the switch SC is released before the time delay relay TR6 reaches the end of its preset period, contacts TR6a will establish an energizing circuit for a starter relay TS (FIG. 10) to energize this relay and cause closure of its contacts TSa, TSb and TSc. This effects a selection of the low speed windings of the motor M, which is a two-speed, reversible induction motor. Accordingly, when the switch SC is released, an energizing circuit for relays TL1 and TR will be established through contacts CRSC9, CR50g, CRMc, CRLSa and TLe. This causes closure of contacts TRa, TRb and TRc, and the motor M will be energized in a direction to move the saddle to the right at a predetermined rate of, for example, 50 inches per minute. At the end of the preset time delay, contacts TR6a will open and contacts TR6b will close. This energizes a relay TF, causing closure of its contacts TFa, TFb, and TFc in the motor energization circuit while opening the contacts TSa, TSb and TSc. This now energizes the motor through its high speed windings. This speed is representatively given at 150 inches per minute, which is three times the initial speed. The saddle continues to advance at the rate of 150 inches per minute until the "anticipation point" is sensed and the contacts K1 open. This deenergizes relay CRK1 and time delay relay TF6. The contacts TR6a then reclose and the contacts TR6b open. The saddle is now caused to approach its ultimate command point at a rate of 50 inches per minute.

The foregoing speed of 50 inches per minute of the saddle continues until the measuring and position sensing system of FIG. 11 indicates the arrival of the saddle 34 at the command position. When this occurs, the contacts K3a will close and the contacts K3b will open. This causes energization of a relay CRK3a and deenergization of the relay CRK3b. This, in turn, produces closure of contacts CRK3Ba to establish an energizing circuit for a relay CRLS. Contacts CRLSa are thereby caused to open to interrupt the energizing circuit for relay TL1 and TR, while contacts CRLSb close to energize relays TL and TR1. It will be noted that contacts TRe must close by the deenergizing of relay TR before relay TL can be energized. An energizing circuit for the relays TL and TR1 also exists through contact SPb of a plugging switch SP. The plugging switch SP is of a commonly available commercial type, as for example the type known as Bulletin 808, made by Allen-Bradley Company, Milwaukee, Wis. The plugging switch is driven by the motor M and when the motor M is driven at any appreciable speed in a direction causing the saddle to move to the right, its contacts SPa will be closed and when it is driven at any appreciable speed in a direction causing the saddle to move to the left, its contacts SPb will be closed. The contacts of the switch SP are closed by virtue of a magnetic coupling effect commonly employed in plugging switches. When the motor is at rest, neither of the contacts SPa nor SPb will be closed. The energizing of relay TR immediately upon passing over the command position causes electrical energy to be imparted to the windings of the motor in a direction tending to positively arrest rotation of the drive shaft of the motor. Accordingly, coasting of the motor is retarded and the motor is reversed in its direction of rotation as rapidly as possible. As soon as the motor M commences rotation in the opposite direction, the contacts SPb open and the contacts SPa close. This is effective to energize the relay TL1 through contacts TLd. Relay TL1 establishes its own holding circuit by contacts TL1a.

During the period of the changeover from energization of the relay TR to energization of the relay TL, the relay CRF is deenergized and remains so until the motor shaft speed is sufficient to cause reversal of the contacts of the plugging switch SP. This results from the operation of a "null" counting circuit including relays CR101, CR102, CR103 and CR104.

The relay CR101 was energized immediately upon the initiation of the automatic positioning cycle by a circuit which includes contacts CR50c, CRMg, CRWb and CRLSc. With the energizing of relay CRLs on reaching the first null, it contacts CRLSd close and energize the relay CR102 through a circuit which also includes contacts CR101a. Thus, the second count of null counting circuit is made. The energizing of relay CR102 opens its contacts CR102a to deenergize relay CRR. This opens the contact CRRc and deenergizes a rapid SOL1 which had theretofore been energized to actuate the clutch 60 and drivingly connect the shaft 56 directly to the shaft 62. By deenergizing SOL1, the motor M is disconnected from the lead screw 40 and will remain so disconnected until the motor M has begun to rotate in the reverse direction. As has been mentioned, the reversal of the motor M will close plugging switch contacts SPa to energize relay TL1. This causes closure of contacts TL1b to energize relay CRF. The relay CRF then closes its contacts CRFb to energize a feed solenoid SOL2. This solenoid operates the valve 134 to deliver fluid pressure to the hydraulic clutch 76. By this means the drive motor M is connected to the lead screw 40 through the feed drive gear box 68. The contacts CRM*k* and CK1*a* being open, the deenergization of relay TR6 is assured and a selection of the slow speed motor windings is made.

Even though the sensing mechanism of FIG. 11 has detected the presence of the saddle 34 in the command position to disengage the motor M from the saddle, the momentum of the saddle will have carried it beyond the command position prior to the time that it will actually come to rest. However, as a result of the deenergizing of the solenoids SOL1 and SOL2, the inertia of the motor M is not added to the inertia of the saddle and the magnitude of overshoot will not be as great as if it were still coupled to the saddle. Also, inconsistancies resulting from variations in electrical conditions are avoided. Inasmuch as the saddle has coasted past the command position, the movement of the saddle to the left after energization of relay CR102 is appropriate to reapproach the command position.

The speed of the saddle as it now moves to the left is reduced materially, as for example to 5 inches per minute. This results from the use of the feed box 68 with SOL3, SOL4 and SOL5 deenergized. This speed prevails until the saddle again crosses the command position whereupon relay CRK3A will be deenergized and relay CRK3B will be energized. This deenergizes relay CRLS by the opening of contacts CRK3B*a*, casing contacts CRLS*b* to reopen and deenergize relay TL. At the same time, contacts CRLS*a* close to energize relay TL1 and TR and contacts TL1*a* close and establish a holding circuit for relay TL. With the deenergization of relay TL, its contact TL*f* opens and relay CRF is deenergized. This deenergizes SOL2 to disconnect the motor M from the lead screw 40. However, when the motor achieves full speed in the right-hand direction again, the relay TR1 will be energized by circuit through the contacts SP*b*. This causes the contacts TR1*b* to close and the relay CRF will be energized by a circuit including contacts TR1*b*, now closed contacts TR*f* and contact CRM*f*. Again, the clutches 60 and 76 are disengaged during the reversal of the motor M, thus precluding the possibility of motor inertia contributing to the degree of override of the saddle past the command point and permitting the saddle to come to rest in a rapid and reliable manner.

Deenergizing the relay CRLS effects a third count in the null counting system previously mentioned. This results from the closure of contacts CRLS*e* which, together with previously closed contacts CR102*a*, effects energization of relay CR103 to cause its contacts CR103*a* to close. At this point, relay CRO is energized by closure of contacts CR103*b* and a holding circuit is formed for the relay CRO by closure of its contacts CRO*a*. The relay CRO also has contacts CRO*b* (FIG. 10) which close to energize solenoid SOL5. The energization of solenoid 5 causes valve 154 to deliver hydraulic fluid to cylinder bore 160 and thereby move the shifter fork 178 and gear 192 for the purpose of further reducing the speed of the saddle. In practice, this reduction is to approximately .5 inch per minute and the saddle will move at this speed as soon as relay TR1 is energized to energize relay CRF and produce consequent energization of the feed solenoid SOL2, thereby engaging the clutch 76. The saddle will continue to move at .5 inch per minute in a right-hand direction until relay CRK3B is deenergized by the reopening of contacts K3B to permit its contacts CRK3B*a* to reclose and reenergize relay CRLS. By this means, contacts CRLS*f* are closed to energize relay CR104, which establishes its own holding circuit by means of contact CR104*a*. Contact CR104*b* are caused to open, thereby deenergize relay CR50. This is accompanied by deenergization of relay CRF in the manner previously described for each reversal, which deenergizes the feed solenoid SOL2 to disengage the drive motor M from the saddle 34. Also, as previously described, a deenergization of relays TL1 and TR will occur followed by the energization of relays TL and TR 1, which ultimately reenergizes relay CRF and reengages the feed clutch 76. The ultimate reenergization of relay TL is accomplished through contacts CR105*a* which close as a result of the energization of relay CR105. Relay CR105 is closed as the result of the opening of contacts CR50*f* upon the deenergization of relay CR50, resulting from the opening of contacts CR104*b*. When relay CR50 is deenergized, its contacts CR50*i* open to deenergize time delay relay TR3 and, after a preset short time delay, its contacts TR3*a* will open to deenergize relay CR20. When this occurs, its contact CR20*b* will open to deenergize relay CR105. This reopens the contacts CR105*a* to terminate energization of motor M.

The momentary energization of the motor M during the preset timing of relay TR6 serves only to remove stress creating contact of the flanks of the lead screw 40 with the flanks of the threads of the nut 38. The action eliminates the possibility of lead screw stresses slightly moving the saddle 34 out of the intended final position. This final movement of the lead screw may be termed "relaxation of the lead screw."

By way of example, in one machine which has been manufactured according to the present invention, the first override of the saddle past the command position is .090 inch; the second overshoot is about .015 inch and the final overshoot is zero.

The progression of the positioning cycle for movement of saddle 34 when it is located to the right of the command position occurs in a manner similar to that already described in connection with the cycle produced when the saddle is located to the left of the command position. The essential difference between the two cycles relates primarily to the first portion of the cycle where the counting circuit (relays CR101 to CR104) is prevented from functioning until a relay CRW has become deenergized, whereafter the remainder of the cycle follows that previously discussed. When the saddle is to the right of the command position, the contacts K3*b* will be initially open to energize the relay CRK3B. This causes its contacts CRK3B*a* to remain closed, initially energizing relay CRLS. This causes closure of contacts CRLS*f* to energize the relay CRW. It will be noted that the energizing circuit relay CRW includes contacts CRSC*e* with which contacts CRW*a* are in parallel to establish a holding circuit after the switch SC has been lifted. It will be appreciated that relay CRW is only energized when relay CRK3A is initially energized so that relays CRSC and CRLS are energized at the same time. Of course, relay CRK3A is energized initially only when the saddle is to the right of the command position. The velocity of the saddle from its initial position toward command position occurs in the same magnitude sequence as that previously described for the left cycle approach; i.e., 50 inches per minute initially with an increase to 150 inches per minute after closure of the contacts TR6*b*. As the saddle moves within range of the anticipation point, the contacts K1 open to deenergize relay CRK1, thereby causing its contacts CRK1*a* to open and deenergize relay TR6. This energizes relay TS to close the contacts TS*a*, TS*b*, and TS*c* and open the conacts TF*a*, TF*b* and TF*c*. Thus, a selection is made of the slow speed windings of the motor M and the speed of the saddle drops to 50 inches per minute. When the saddle crosses the command position, a change is made from relay TL to relay TR energization in the manner previously described. The approach by movement to the right is made at 50 inches per minute. When the command position is again sensed, the cycle continues as in the case of the first described cycle.

The milling cycle is accomplished by moving the saddle to the command position with a single approach utilizing a selected feed rate until a preset "milling cycle medium anticipation point" is reached, which may be, for example, .120 inch to the right or to the left of the command position. The initiation of the positioning cycle commences with depression of the switch SC and with the switch S1 in the milling position, with its contacts closed, thereby energizing relay CRM. This action produces energization of relay CR50 which establishes its own holding circuit by contacts CR50a. As a result, relay CR20 will be energized as will a relay CRSW1. Assuming that the saddle is to the left of the command position, a relay CRSW4 will be energized through contacts CRMi, CRK1c and CRSCf. Relay CRK3b will also be energized and relay CR20 is energized through a circuit including contacts CR50b and CRK3Ba. Contacts CR50j close to establish an energizing circuit for relay CRF, thereby causing energization of the feed solenoid SOL 2. As soon as switch SC is released, relay CRSCd deenergizes and relays TL1 and TR energize, starting motor M. If the distance of the saddle from the command position exceeds the previously set anticipation value of 3 inches, relay CRK1 is energized and receives its command from the coarse transformer winding. Assuming this to be the case, then the member now proceeds toward the command position with, for example, a speed of 36 inches per minute until the 3 inch point is reached, whereupon relay CRK1 deenergizes to energize a relay CRSW2 by the closing of contacts CRK1d and through previously closed contacts CRSW1a. The contacts of relay CRSW2 are located in the measuring position amplifier and they serve to change the sensitivity of the relay which controls contacts K1 to cause the contacts K1 to reclose and establish a new position closer to the command point at which the contacts K1 will reopen. This is done by switching the control of contacts K1 from the coarse transformer windings to the medium transformer windings. Now, for example, the second point at which contacts K1 will open is about .120 inch from the command point. At this point relay CRK1 again deenergizes to close its contacts CRK1e and energize the solenoid CRSW3 through a circuit which includes contacts CRSW1b and CRSW4b. As a result, contacts CRSW3b are opened. In view of the fact that contacts CRK1f, which are in parallel with contacts CRSW3b, have been opened by the deenergization of relay CRK1, energization of the feed selector switch S3 through the circuit which includes contacts CRMk is prevented, and SOL 3 and SOL 4 are deenergized. SOL 5 will continue to be energized, however, through a circuit including contacts CROb. For this reason, traverse speed now proceeds at .5 inch per minute until the command point is reached and contacts K3B open to deenergize relay CRK3B. This results in the deenergization of relay CR50, relays TL1 and TR and the energizing of relay CR105. Since relay CRK3a becomes energized as relay CRK3b is deenergized, the rotation of the motor M is reversed by the energization of relay TR. However, energization of the motor M at this point continues only until time delay relay TR3 completes its timing cycle, which is sufficient to relax any stresses in the lead screw 40 and move the flanks of the lead screw out of contact with the thread flanks of the follower nut 38 of the saddle 34. During such final operation, of course, it will be apparent that the motor is plugged and the saddle has been disengaged from the motor M by deenergization of relay CRF and the consequent opening of its contact CRFb. It should be pointed out, however, that there was no disengagement of the clutches 60 and 76 upon the reduction to the .5 inch per minute speed.

Positioning of the saddle from the right of the command position in the milling cycle proceeds according to the manner previously described except for a difference in the choice of anticipation relays, relay CRK3 and the final lead screw relaxation relay. Approach from the right requires the operation of a relay CR21 through contacts CRMm and CRK3Ai in place of relay CR20. Also, a relay CR106 is energized through contacts CR21A instead of relay CR105. Finally, of course, the ultimate command position is sensed by energization of relay CRK3b rather than relay CRK3a.

If the initial position of the saddle is less than 3 inches and greater than .120 inch from the command position, relay CRK1 will be energized from the medium transformer windings of the measuring system to command a sequence of relay operation that occurs following actuation of the switch SC. This operation energizes relay CRSC, CR50, CRSW2, CR20 or CR21, CRK3a or CRK3b, then CRK1 and then relay CRSW3, and TF or TS after the energization of relay TR6. After the release of switch SC, relays TL1 and TR or relays TR1 and TL energize. Traverse proceeds with the same speed schedule as outlined above until relay CRK1 deenergizes approximately .100 inch from the command point where the same advance occurs as mentioned above.

If the initial member position is less than .100 inch from the command position, relay CRSW3 will immediately energize upon release of the switch SC, and, since relay CRK1 does not energize, all speed selection solenoids except solenoid 5 will be deenergized, relay TS will be energized, relays TL1 and TR or TR1 or TL will also be energized and the remainder of the cycle will occur as outlined previously.

In each of the cycles outlined above, the final position of the saddle 34 (or the spindle head 26, if operation of the spindle head is being accomplished) is independent of the characteristics of the motor, the electric current and associated starter switching. It has been found that the motor M has considerable inertia which may variously affect the degree of overrun of the saddle in accordance with the voltage of the power supply system, the temperature of the motor, or the like. It will also be noted that the major portion of the electrical system is operated by direct current. Accordingly, the timing of the sequence of events is independent of the particular phase of a cycle of alternaing current on which any command is given, and possible errors in this connection are eliminated. As mentioned previously, all final commands in positioning of the saddle are attained while the motor is disengaged from the saddle. In this connection, it may also be mentioned that the sensing of the command position by operation of contacts K3a and K3b may be established to occur over a dimensional range which will in fact produce opening or closing of said contacts slightly ahead of the actual command position. However, any such error would only be such as would be sufficient to correspond with the degree of override of the saddle at its .5 inch per minute rate during final positioning.

A capacitive resistance network TD protects components of the circuitry from damage as a result of possible arcing of contacts CRFb.

One of the important features of the machine disclosed herein is the ability to remotely change gears in the gear box. The operator can select any desired feed speed without leaving his normal station to manually change the gears of the feed drive gear box 68. Of course, the functioning of the gear box in changing gears in the milling cycle is highly advantageous in being able to mill to a selected position with great accuracy.

While the invention disclosed herein is well calculated to fulfill the objects above stated, it will be apparent that the invention is susceptible of modification, variation and change without departing from the fair meaning or scope of the subjoined claims. In particular, the specific speeds and distances mentioned herein are exemplary only, and are not to be construed as limiting in any way.

What is claimed is:

1. In a machine tool having a work or tool support member movable along a given axis, a positioning mechanism for moving said support member along said axis, said mechanism including a drive motor, power transmission means between said motor and the support member, a clutch forming a part of said power transmission means, means for selecting a position to which said support member is to be moved, means responsive to said selecting means for controlling the energization of said motor to move the support member to a selected position, means responsive to the arrival of said support member at said selected position for disengaging said clutch and reversing the direction of energization of said motor, and means responsive to the reverse operation of said motor for re-engaging said clutch.

2. In a machine tool having a work or tool support member movable along a given axis, a positioning mechanism for moving said support member along said axis, said mechanism including a drive motor, a lead screw, power transmission means between said motor and said lead screw, a clutch forming a part of said power transmission means, means for selecting a position to which the support member is to be moved, means controlling the energization of said motor for causing said motor to move said support member to a selected position, means responsive to the arrival of said support member at said selected position for disengaging said clutch and reversing the direction of energization of said motor, means responsive to the reverse operation of said motor for re-engaging said clutch, and means for limiting the duration of said clutch re-engagement to a period of time sufficient to relieve the stresses in said lead screw.

3. In a machine tool having a work or tool support member movable along a given axis, a positioning mechanism for moving said support member along said axis, said mechanism including a drive motor, power transmission means between said motor and the support member, a clutch means forming a part of said power transmission means, means for selecting a given position to which the support member is to be moved, means for controlling the energization of said motor to move the support member repeatedly across a selected position from opposite sides thereof at successively reduced speed, means responsive to each arrival of the support member at said selected position for disengaging said clutch means and reversing the direction of energization of said motor, and means responsive to the reverse operation of said motor following at least some of said clutch disengagements for re-engaging said clutch means.

4. In a machine tool having a work or tool support member movable along a given axis, a positioning mechanism for moving said support member along said axis to a selected position, said mechanism including a drive motor, power transmission means disposed between said motor and said support member and having two separate paths, a pair of hydraulically actuated clutches, each disposed in one of said paths, a common valve for delivering hydraulic fluid to said clutches, said valve having a first position in which fluid is delivered to one of said clutches and is prevented from flowing to the other of said clutches, a second position in which fluid is delivered to said other clutch and is prevented from flowing to said one clutch, and a third position in which fluid is prevented from flowing to both of said clutches so as to disengage both of said clutches and disconnect said motor from said support, means responsive to the arrival of said support member at said selected position for actuating said valve to said third position and reversing the direction of energization of said motor, and means responsive to the reverse operation of said motor to re-engage said clutch.

References Cited

UNITED STATES PATENTS

| | | | |
|---|---|---|---|
| 2,225,913 | 12/1940 | Lange et al. | 82—29 |
| 2,561,346 | 7/1951 | De Vlieg et al. | 77—63 |
| 2,722,853 | 11/1955 | Knosp et al. | 77—63 |
| 2,961,898 | 11/1960 | Grinage | 77—63 X |

LEONIDAS VLACHOS, *Primary Examiner.*

U.S. Cl. X.R.

90—21; 77—63